July 19, 1966     R. EICHENAUER     3,261,187

STEERING COLUMN AND IGNITION LOCK FOR MOTOR VEHICLES

Original Filed March 1, 1962     2 Sheets-Sheet 1

INVENTOR:
RUDOLF EICHENAUER

BY
Kurt Kelman
agent

INVENTOR:

Rudolf Eichenauer

BY Kurt Kelman
    agent

United States Patent Office 3,261,187
Patented July 19, 1966

3,261,187
STEERING COLUMN AND IGNITION LOCK
FOR MOTOR VEHICLES
Rudolf Eichenauer, Hollbergstrasse 1,
Frankfurt am Main, Germany
Continuation of application Ser. No. 176,758, Mar. 1,
1962. This application Sept. 15, 1964, Ser. No. 396,577
5 Claims. (Cl. 70—252)

This is a continuation of my application Serial No. 176,758, filed March 1, 1962, now abandoned.

This invention relates to a combined steering column and ignition lock for motor vehicles.

An object of the invention is the provision of a combined steering column and ignition lock which automatically unlocks the steering column when a key is inserted in the lock and turned from an OFF position to an ON position, and which locks the steering column when the key is withdrawn while the lock is in the OFF position.

Another object is the provision of a combined steering column and ignition lock which is simple in its construction and has relatively few movable parts other than those customary in ignition locks.

With these and other objects in view, the invention in one of its aspects provides a lock with a housing equipped to be secured to the steering column of a vehicle. A lock bolt is movable on the housing between a locking position in which the bolt projects from the housing for engagement with the steering column, and a retracted position. The movement of the bolt is actuated by a mechanism which includes yieldably resilient means for permanently urging the bolt toward its locking position, and a driving member which is mounted on the housing for movement in engagement with the bolt against the urging of the afore-mentioned resilient means.

A lock cylinder is rotatably mounted in the housing for angular movement between an OFF position and an ON position. The cylinder is operatively connected to the driving member for moving the same when the cylinder rotates. A key slot at least partly defined by the cylinder receives an axially inserted key. A latch is mounted on the housing for movement between an operative position and an inoperative position. In the operative position of the latch, a first portion thereof engages a recess in the lock bolt when the same is in its retracted position while a second latch portion extends into the key slot for engagement with the inserted key when the cylinder is in the OFF position. In the inoperative position, the latch is withdrawn from the recess in the lock bolt and from the key slot.

The term OFF, as employed in this specification and the appended claims relates to that position of a key, lock cylinder and associated elements, in which a connected ignition switch interrupts an ignition circuit, whereas the ON position of the key, the lock cylinder and of associated elements is correlated with the position of the ignition switch in which the ignition circuit is closed.

According to an important feature of this invention, the key employed with the lock is formed with a recess which is engaged by the aforementioned second latch portion in the operative position of the latch when the key is fully inserted in the key slot. A cam on the key adjacent the recess engages the second latch portion during withdrawal of the key from the key slot and moves the latch from the operative to the inoperative position. An ignition switch is operatively connected to the lock cylinder in the usual manner.

Other features and many advantages of this invention will be readily appreciated as the same becomes better understood by reference to the following detailed description of a preferred embodiment when considered with the attached drawing in which.

Figure 1:
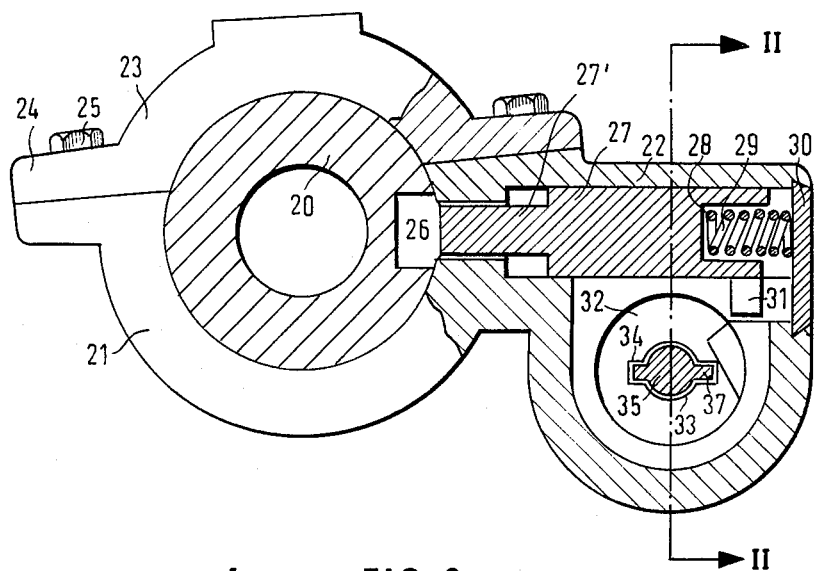
FIG. 1 shows a lock arrangement of the invention mounted on the steering column of a vehicle, not otherwise shown, the view being in section perpendicular to the steering column on the line I—I of FIG. 2.

Referring now to the drawing and first to FIG. 1, the safety lock of the present invention is shown in association with the steering column 20 of a motor car or like craft. The lock is attached to the steering column by means of a split clamp one part 21 of which is integral with the lock housing 22. It is fastened to the steering column by means of the other clamp part 23 whose flange 24 is fastened to a cooperating flange of part 21 by bolts 25. The steering column has a recess 26 which is engaged by the lock bolt 27 of the safety lock. The lock bolt is slidably mounted in the lock housing 22 for engagement with the recess 26 and has a shoulder 27' cooperating with a corresponding shoulder in the lock housing for limiting the forward movement of the bolt towards the recess 26. A compression spring 29 is mounted in a bore 28 at the end of the bolt remote from the recess 26 and is restrained by a cover plate 30 of the lock housing 22. The spring 29 biases the lock bolt toward its locking position wherein it engages the recess 26 of the steering column 20.

Figure 2:
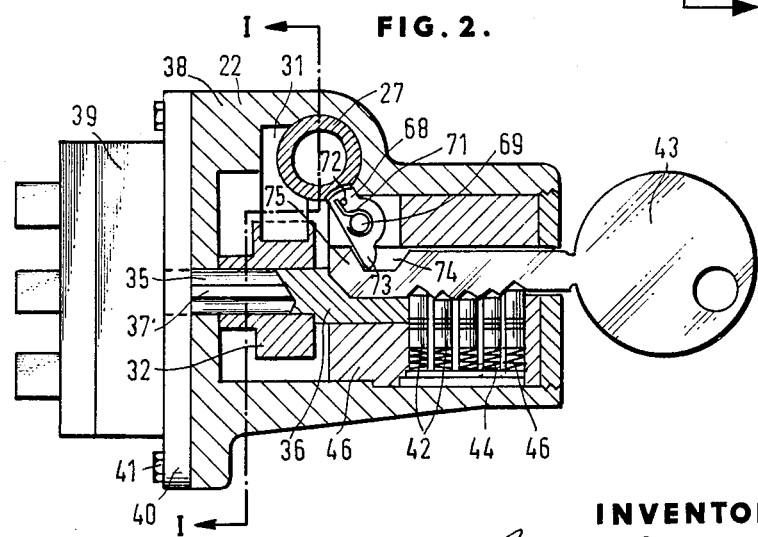
FIG. 2 shows the apparatus of FIG. 1 in section on the line II—II.

The bolt carries a catch 31 engageable by a driving member 32 for movement of the lock bolt against the bias of the spring 29 from its locking position into a retracted position when the driving member 32 is rotated about its axis 37'. The driving member 32 has an axial bore 33 with diametrically opposed axially extending grooves 34. As seen in FIG. 2, the lock has a cylinder 36 with an axial extension 35 received in the bore 33. Two diametrically opposed ribs 37 on the extension 35 engage the grooves 34 so that the driving member 32 is secured on the lock cylinder extension 35 for rotation therewith.

Referring further to FIG. 2, it is seen that the lock cylinder extension 35 passes through a bottom member 38 of the lock housing 22 into an electrical ignition switch 39, which is conventional in itself and will not be further described. The switch is mounted on the bottom member of the lock housing by means of a flange 40 which is fastened to the bottom member by bolts 41.

The lock cylinder 36 carries conventional tumblers 42 extending transversely to the cylinder axis 37'. As usual, tumbler pins 45 are carried by a tumbler support 46 which forms a bearing sleeve for the lock cylinder 36, the tumblers 42 and tumbler pins 45 being biased by springs 44 to engage corresponding cuts in a key 43. The tumbler support 46 is fixedly mounted in the lock housing 22.

Figure 3:
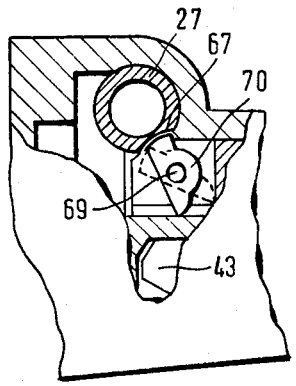
FIG. 3 is a fragmentary, partly sectional view of the device of FIG. 2 in a different operational position.

As appears from FIGS. 2 and 3, the lock bolt 27 has a peripheral recess 67 which, in the retracted position of the bolt, is aligned with a latch 70 for engagement with an arm 68 of the latch. A shaft 69 which pivotally supports the latch is mounted on the tumbler support 46. In the position shown in FIG. 2, the latch arm 68 is held in engagement with the recess 67 of the lock bolt by a leaf spring 71 which has one end attached to the shaft 69 while its other end engages a pin 72 on the arm 68 of the latch. When thus biased clockwise the other arm 73 of the latch 70 engages a cut 74 in the key 43, this key cut being defined by a projecting cam portion 75 of the key. When the lock bolt is in its locking position, wherein its end engages the recess 26 of the steering column, the latch 70 assumes the position shown in FIG. 4 and, in broken lines, in FIG. 3.

Figure 4:
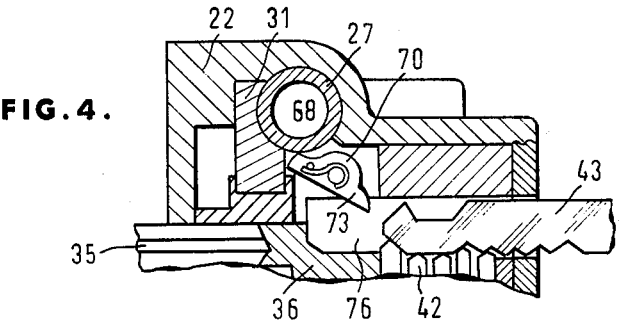
FIG. 4 shows the device of FIG. 2 in yet another operational position in a fragmentary view similar to that of FIG. 2.

The afore-described apparatus operates as follows:

When the key 43 is withdrawn from the key slot 76 and the lock bolt 27 is in its locking position, the arm 68 of the latch 70 is urged against the cylindrical wall of the bolt by the spring 71, and the latch arm 73 is sufficiently withdrawn from the key slot 76 to be out of the path of the key 43, as is shown in FIG. 4. The lock cylinder 36 and the ignition switch 39 (not shown in FIG. 4) are in the OFF position in which the non-illustrated ignition circuit of the motor vehicle is interrupted.

To close the ignition circuit and to unlock the steering column 20, the key 43 is inserted into the slot 76 and turned into the ON position. The lock cylinder 36 is thereby rotated about its axis 37′ with the driving member 32, and the lock bolt 27 is retracted. In the fully retracted position of the bolt, the peripheral recess 67 is aligned with the latch 70, and the latch arm 68 drops into the recess under the force of the spring 71. The lock cylinder 36 is suitably recessed, as shown in FIG. 3 to permit the corresponding displacement of the latch arm 73. The vehicle is ready for operation.

When the ignition is turned off by rotating the key 43 with the lock cylinder 36 into the OFF position illustrated in FIG. 2, the driving member 32 moves out of engagement with the catch 31 into the position of the driving member illustrated in FIG. 1, but the lock bolt 27 is retained in its unlocking position (as shown in FIG. 1) against the force of the spring 29 by the latch 70. During the rotating movement of the key 43 and the lock cylinder 36 from the ON to the OFF position, the cut 74 in the key 43 receives the latch arm 73.

Upon subsequent withdrawal of the key 43 from the key slot 76, the projecting key portion 75 cammingly engages the latch arm 73 and pivots the latch 70 on its shaft 69 into the position indicated in broken lines in FIG. 3, and also shown in FIG. 4. The resulting withdrawal of the latch arm 68 from the recess 67 of the lock bolt 27 permits the bolt to be projected into its locking position by the spring 29.

The combined steering column and ignition lock of the invention thus operates in the same manner as a conventional ignition lock. The insertion, rotation, and withdrawal of the key, entirely the same as in the usual ignition lock, also automatically unlocks the steering column and projects the lock bolt 27 into a position from which it drops into the recess 26 of the steering column when the latter is being turned into the aligned position shown in FIG. 1.

It will be appreciated that the ignition switch 39 may be equipped with contacts in circuit with an electric starter motor which is energized when the key 43 is turned beyond the ON position into a START position, as is usual.

While the invention has been described in connection with certain specific and preferred embodiments, it will be clearly understood that many modifications and variations may occur to the skilled in the art, particularly after benefitting from the present teaching, without departing from the spirit and scope of this invention, as defined in the appended claims.

What is claimed is:

1. A lock arrangement for a vehicle having a steering column comprising, in combination:
    (a) a housing;
    (b) attaching means for securing said housing to the steering column of said vehicle;
    (c) a lock bolt formed with a recess and movable on said housing between a locking position and a retracted position, said bolt when in said locking position projecting from said housing for engagement with said steering column;
    (d) bolt actuating means for actuating movement of said bolt between said positions thereof, said actuating means including
        (1) yieldably resilient means permanently urging said bolt toward the locking position thereof, and
        (2) a driving member mounted on said housing for movement in engagement with said bolt against the urging of said resilient means;
    (e) lock cylinder means mounted on said housing for rotation about an axis between an OFF position and an ON position, said cylinder means being operatively connected to said driving member for movement of the latter when said cylinder means rotates about said axis, said cylinder means defining at least a portion of a key slot for receiving an axially inserted key; and
    (f) latch means mounted on said housing for movement between an operative position in which a first portion of the latch means engages said recess of said lock bolt when the same is in said retracted position, while a second portion of said latch means extends into said key slot for engagement with said inserted key when said cylinder means is in said OFF position of the same, and an inoperative position in which said latch means is withdrawn from said recess and at least substantially withdrawn from said key slot.

2. An arrangement as set forth in claim 1, further comprising a key axially movable inward and outward of said key slot toward and away from a fully inserted position, said key being formed with a recess therein, said second portion of said latch means engaging said recess in said key transversely of said axis when said latch means is in the operative position thereof while the key is in the fully inserted position, and cam means on said key adjacent said recess and engageable with said second portion during said outward movement of said key for moving said latch means from said operative toward said inoperative position thereof.

3. An arrangement as set forth in claim 2, wherein said portions of said latch means are fixedly connected.

4. An arrangement as set forth in claim 2, wherein said latch means is pivotally mounted on said housing for angular movement between said positions thereof.

5. An arrangement as set forth in claim 2, further comprising an ignition switch mounted on said housing and operatively connected to said cylinder means for operation thereby.

References Cited by the Examiner

UNITED STATES PATENTS

| Re. 20,352 | 5/1937 | Smith | 70—252 X |
| 1,342,728 | 6/1920 | Welch | 70—252 |
| 2,100,718 | 11/1937 | Mahee | 70—252 |
| 2,148,609 | 2/1939 | Edwards | 70—252 |

PATRICK A. CLIFFORD, *Primary Examiner.*

B. R. GAY, *Assistant Examiner.*